US011838107B2

(12) United States Patent
Shepherd et al.

(10) Patent No.: US 11,838,107 B2
(45) Date of Patent: Dec. 5, 2023

(54) BIO-TELEMETRY EXTRACTION FROM ONLINE SESSIONS

(71) Applicant: Dell Products L.P., Round Rock, TX (US)

(72) Inventors: Michael Shepherd, Leander, TX (US); Jonathan Whitson, Oklahoma City, OK (US)

(73) Assignee: DELL PRODUCTS L.P., Round Rock, TX (US)

( * ) Notice: Subject to any disclaimer, the term of this patent is extended or adjusted under 35 U.S.C. 154(b) by 0 days.

(21) Appl. No.: 17/581,594

(22) Filed: Jan. 21, 2022

(65) Prior Publication Data

US 2023/0239064 A1    Jul. 27, 2023

(51) Int. Cl.
*H04J 3/06*    (2006.01)
*H04L 51/046*    (2022.01)
*H04L 9/40*    (2022.01)

(52) U.S. Cl.
CPC .......... *H04J 3/0667* (2013.01); *H04J 3/0685* (2013.01); *H04L 51/046* (2013.01); *H04L 63/0815* (2013.01)

(58) Field of Classification Search
CPC ..... H04J 3/0667; H04J 3/0685; H04L 51/046; H04L 63/0815
See application file for complete search history.

(56) References Cited

U.S. PATENT DOCUMENTS

| 2013/0258042 A1 | 10/2013 | Shun et al. |
| 2017/0177928 A1 | 6/2017 | Cunico et al. |
| 2019/0109660 A1* | 4/2019 | Akins .................. H03M 13/09 |
| 2020/0076566 A1* | 3/2020 | Alfonseca ............. H04L 12/403 |

FOREIGN PATENT DOCUMENTS

CN    112085630 A    12/2020

OTHER PUBLICATIONS

Shepherd, et al. "Determining Loss of Focus in Online Sessions" U.S. Appl. No. 17/581,263, filed Jan. 21, 2022, 39 pages.
Shepherd, et al. "Information Extraction from Live Online Sessions" U.S. Appl. No. 17/678,758, filed Feb. 23, 2022, 40 pages.
Notice of Allowance dated Feb. 17, 2023 for U.S. Appl. No. 17/581,263, 21 pages.

* cited by examiner

*Primary Examiner* — Ronald B Abelson
(74) *Attorney, Agent, or Firm* — Amin, Turocy & Watson, LLP

(57) ABSTRACT

A system can, in response to determining to capture bio telemetry data associated with client devices, synchronize respective second clock times of respective client devices with a first clock time maintained by a network time protocol server, wherein the respective client devices are configured to capture the bio telemetry data of respective users associated with the client devices, wherein the respective users are associated with respective user accounts. The system can synchronize the bio telemetry data of the respective users based the respective second clock times.

20 Claims, 9 Drawing Sheets

600

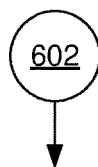

IN RESPONSE TO DETERMINING TO CAPTURE BIO TELEMETRY DATA ASSOCIATED WITH CLIENT DEVICES, SYNCHRONIZING RESPECTIVE SECOND CLOCK TIMES OF RESPECTIVE CLIENT DEVICES WITH A FIRST CLOCK TIME MAINTAINED BY A NETWORK TIME PROTOCOL SERVER, WHEREIN THE RESPECTIVE CLIENT DEVICES ARE CONFIGURED TO CAPTURE THE BIO TELEMETRY DATA OF RESPECTIVE USERS ASSOCIATED WITH THE CLIENT DEVICES, AND WHEREIN THE RESPECTIVE USERS ARE ASSOCIATED WITH RESPECTIVE USER ACCOUNTS 604

SYNCHRONIZING THE BIO TELEMETRY DATA OF THE RESPECTIVE USERS BASED ON THE RESPECTIVE SECOND CLOCK TIMES 606

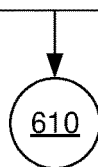

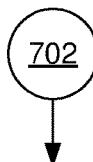

MAINTAINING A NETWORK TIME PROTOCOL SERVER, WHEREIN THE NETWORK TIME PROTOCOL SERVER MAINTAINS A FIRST CLOCK TIME 704

IN RESPONSE TO DETERMINING TO CAPTURE BIO TELEMETRY DATA ASSOCIATED WITH A FIRST CLIENT COMPUTING DEVICE, SYNCHRONIZING A SECOND CLOCK TIME OF THE CLIENT COMPUTING DEVICE WITH THE FIRST CLOCK TIME, WHEREIN THE CLIENT COMPUTING DEVICE IS CONFIGURED TO CAPTURE BIO TELEMETRY DATA OF A FIRST USER ASSOCIATED WITH THE FIRST CLIENT COMPUTING DEVICE, AND WHEREIN THE FIRST USER IS ASSOCIATED WITH A FIRST USER ACCOUNT 706

IN RESPONSE TO DETERMINING TO CAPTURE BIO TELEMETRY DATA ASSOCIATED WITH A SECOND CLIENT COMPUTING DEVICE, SYNCHRONIZING A THIRD CLOCK TIME OF THE CLIENT COMPUTING DEVICE WITH THE FIRST CLOCK TIME, WHEREIN THE SECOND CLIENT COMPUTING DEVICE IS CONFIGURED TO CAPTURE BIO TELEMETRY DATA OF A SECOND USER ASSOCIATED WITH THE SECOND CLIENT COMPUTING DEVICE 708

SYNCHRONIZING THE BIO TELEMETRY DATA OF THE FIRST USER WITH THE BIO TELEMETRY DATA OF THE SECOND USER BASED ON THE SECOND CLOCK TIME AND THE THIRD CLOCK TIME 710

IN RESPONSE TO DETERMINING TO CAPTURE BIO TELEMETRY DATA ASSOCIATED WITH A FIRST CLIENT COMPUTING DEVICE, SYNCHRONIZING A SECOND CLOCK TIME OF THE CLIENT COMPUTING DEVICE WITH A FIRST CLOCK TIME MAINTAINED BY A NETWORK TIME PROTOCOL SERVER, WHEREIN THE CLIENT COMPUTING DEVICE IS CONFIGURED TO CAPTURE BIO TELEMETRY DATA OF A FIRST USER ASSOCIATED WITH THE FIRST CLIENT COMPUTING DEVICE, AND WHEREIN THE FIRST USER IS ASSOCIATED WITH A FIRST USER ACCOUNT 804

↓

IN RESPONSE TO DETERMINING TO CAPTURE BIO TELEMETRY DATA ASSOCIATED WITH A SECOND CLIENT COMPUTING DEVICE, SYNCHRONIZING A THIRD CLOCK TIME OF THE CLIENT COMPUTING DEVICE WITH THE FIRST CLOCK TIME, WHEREIN THE SECOND CLIENT COMPUTING DEVICE IS CONFIGURED TO CAPTURE BIO TELEMETRY DATA OF A SECOND USER ASSOCIATED WITH THE SECOND CLIENT COMPUTING DEVICE 806

↓

SYNCHRONIZING THE BIO TELEMETRY DATA OF THE FIRST USER WITH THE BIO TELEMETRY DATA OF THE SECOND USER BASED ON THE SECOND CLOCK TIME AND THE THIRD CLOCK TIME 808

BIO-TELEMETRY EXTRACTION FROM ONLINE SESSIONS

BACKGROUND

Multiple users can interact online, such as in online sessions. Online sessions can comprise multi-participant video meetings conducted with computers that communicate across a communications network.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

An example system can operate as follows. The system can, in response to determining to capture bio telemetry data associated with client devices, synchronize respective second clock times of respective client devices with a first clock time maintained by a network time protocol server, wherein the respective client devices are configured to capture the bio telemetry data of respective users associated with the client devices, wherein the respective users are associated with respective user accounts. The system can synchronize the bio telemetry data of the respective users based on the respective second clock times.

A method can comprise maintaining, by a system comprising a processor, a network time protocol server, wherein the network time protocol server maintains a first clock time. The method can further comprise, in response to determining to capture bio telemetry data associated with a first client computing device, synchronizing, by the system, a second clock time of the client computing device with the first clock time, wherein the client computing device is configured to capture bio telemetry data of a first user associated with the first client computing device, and wherein the first user is associated with a first user account. The method can further comprise, in response to determining to capture bio telemetry data associated with a second client computing device, synchronizing, by the system, a third clock time of the client computing device with the first clock time, wherein the second client computing device is configured to capture bio telemetry data of a second user associated with the second client computing device. The method can further comprise synchronizing, by the system, the bio telemetry data of the first user with the bio telemetry data of the second user based on the second clock time and the third clock time.

An example non-transitory computer-readable medium can comprise instructions that, in response to execution, cause a system comprising a processor to perform operations. These operations can comprise, in response to determining to capture bio telemetry data associated with a first client computing device, synchronizing a second clock time of the client computing device with a first clock time maintained by a network time protocol server, wherein the client computing device is configured to capture bio telemetry data of a first user associated with the first client computing device, and wherein the first user is associated with a first user account. These operations can further comprise, in response to determining to capture bio telemetry data associated with a second client computing device, synchronizing a third clock time of the client computing device with the first clock time, wherein the second client computing device is configured to capture bio telemetry data of a second user associated with the second client computing device. These operations can further comprise synchronizing the bio telemetry data of the first user with the bio telemetry data of the second user based on the second clock time and the third clock time.

BRIEF DESCRIPTION OF THE DRAWINGS

Numerous embodiments, objects, and advantages of the present embodiments will be apparent upon consideration of the following detailed description, taken in conjunction with the accompanying drawings, in which like reference characters refer to like parts throughout, and in which:

FIG. 6 illustrates an example process flow that can facilitate bio-telemetry extraction from online sessions, in accordance with an embodiment of this disclosure;

FIG. 7 illustrates an example process flow that can facilitate bio-telemetry extraction from online sessions, in accordance with an embodiment of this disclosure;

FIG. 8 illustrates an example process flow that can facilitate bio-telemetry extraction from online sessions, in accordance with an embodiment of this disclosure;

DETAILED DESCRIPTION

Overview

According to the present techniques, virtual agents can be leveraged to extract a full online experience from meetings.

With the advent of virtual meetings, there arises an opportunity to garner information from these meetings. For example, speech can be automatically transcribed to text. The present techniques can be implemented to capture and tie bio telemetry (e.g., electroencephalography (EEG)) information of an individual back to that person. The extraction of this information can open up opportunities in areas such as instructional design, meeting fatigue detection, meeting sentiment analysis, employer/learner engagement analysis, and meeting attendance automation.

Prior techniques can lack an ability to stream bio telemetry information from an individual during an online session, while tying this data back to other captures of online information. This can remove an ability to perform advanced analysis on individuals who are attending meetings. While the examples described herein generally involve online sessions, it can be appreciated that the present techniques can be applied in different scenarios. The present techniques can generally be applied to synchronize bio telemetry data that is generated from a variety of sources. Synchronize bio telemetry data that is generated from a variety of sources could apply to other scenarios, such as virtual reality environments in which multiple users interact.

A problem with prior techniques can be that, without extraction of full experience data from online sessions, it can be that there is no way to improve these experiences in a research drive way.

Another problem with prior techniques can be that many different platforms exist for hosting online meetings with different capabilities of information capture, and this scenario can create a lack of data standardization.

The present techniques can be implemented to facilitate robotic process automation (RPA) bots presenting a web uniform resource locator (URL) in an online session chat that gives participants who have bio telemetry devices an ability to stream their data directly to the bot as part of information capture within the session.

According to the present techniques, an RPA bot can be leveraged to function as an NTP server to facilitate accurately capturing time.

According to the present techniques, streaming bio telemetry information from multiple participants in an online session can be performed in order to garner meaningful insights.

According to the present techniques, connections formed through online chat can be used to die data back to an individual.

Example Architectures and User Interfaces

Figure 1:
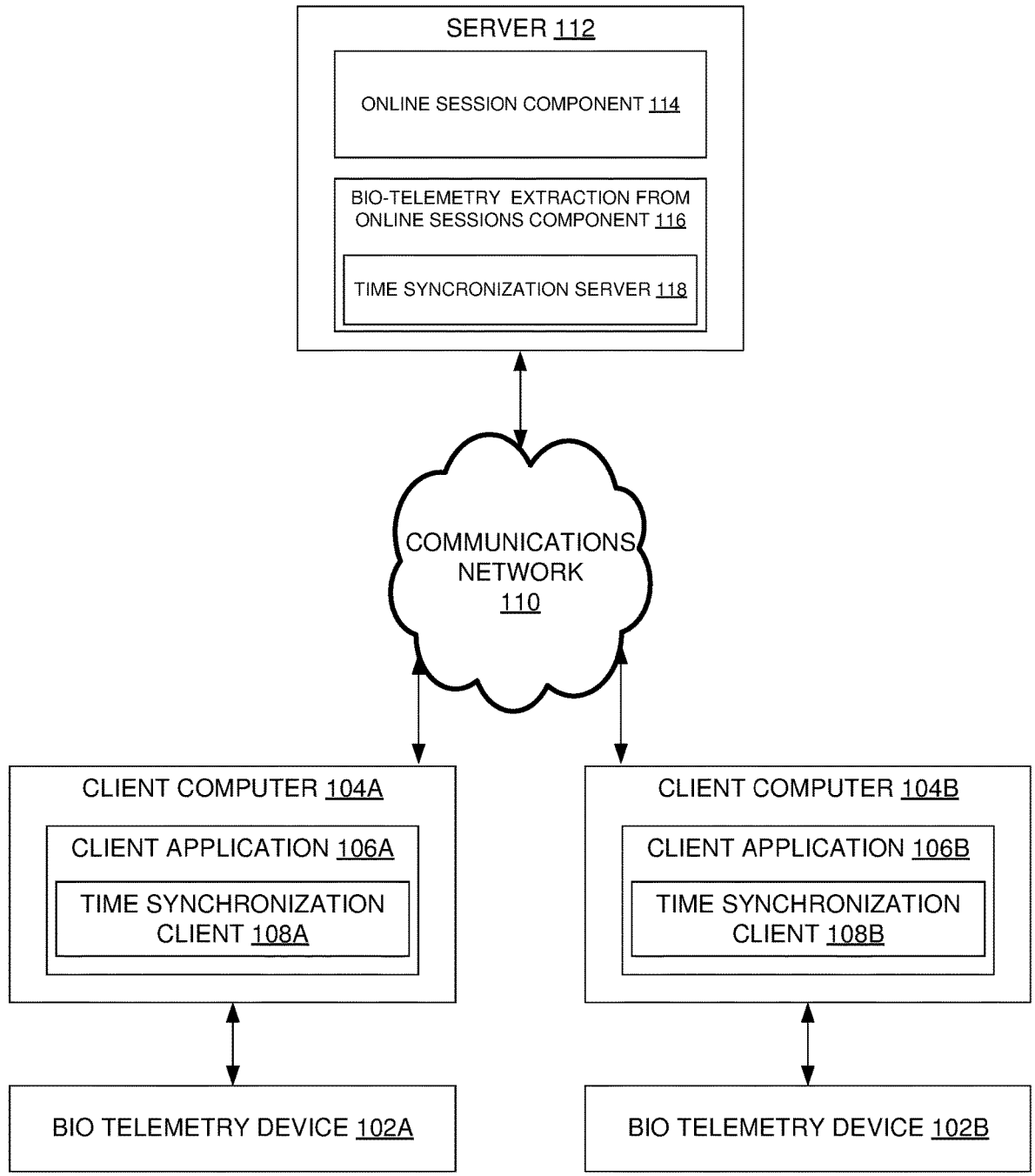
FIG. 1 illustrates an example system architecture that can facilitate bio-telemetry extraction from online sessions, in accordance with an embodiment of this disclosure.

FIG. 1 illustrates an example system architecture 100 that can facilitate bio-telemetry extraction from online sessions, in accordance with an embodiment of this disclosure.

System architecture comprises bio telemetry device 102A, bio telemetry device 102B, client computer 104A, client computer 104B, communications network 110, and server 112. In turn, client computer 104A comprises client application 106A, which comprises time synchronization client 108A. Client computer 104B comprises client application 106B, which comprises time synchronization client 108B. Server 112 comprises online session component 114 and bio-telemetry extraction from online sessions component 116 (which comprises time synchronization server 118).

Figure 9:
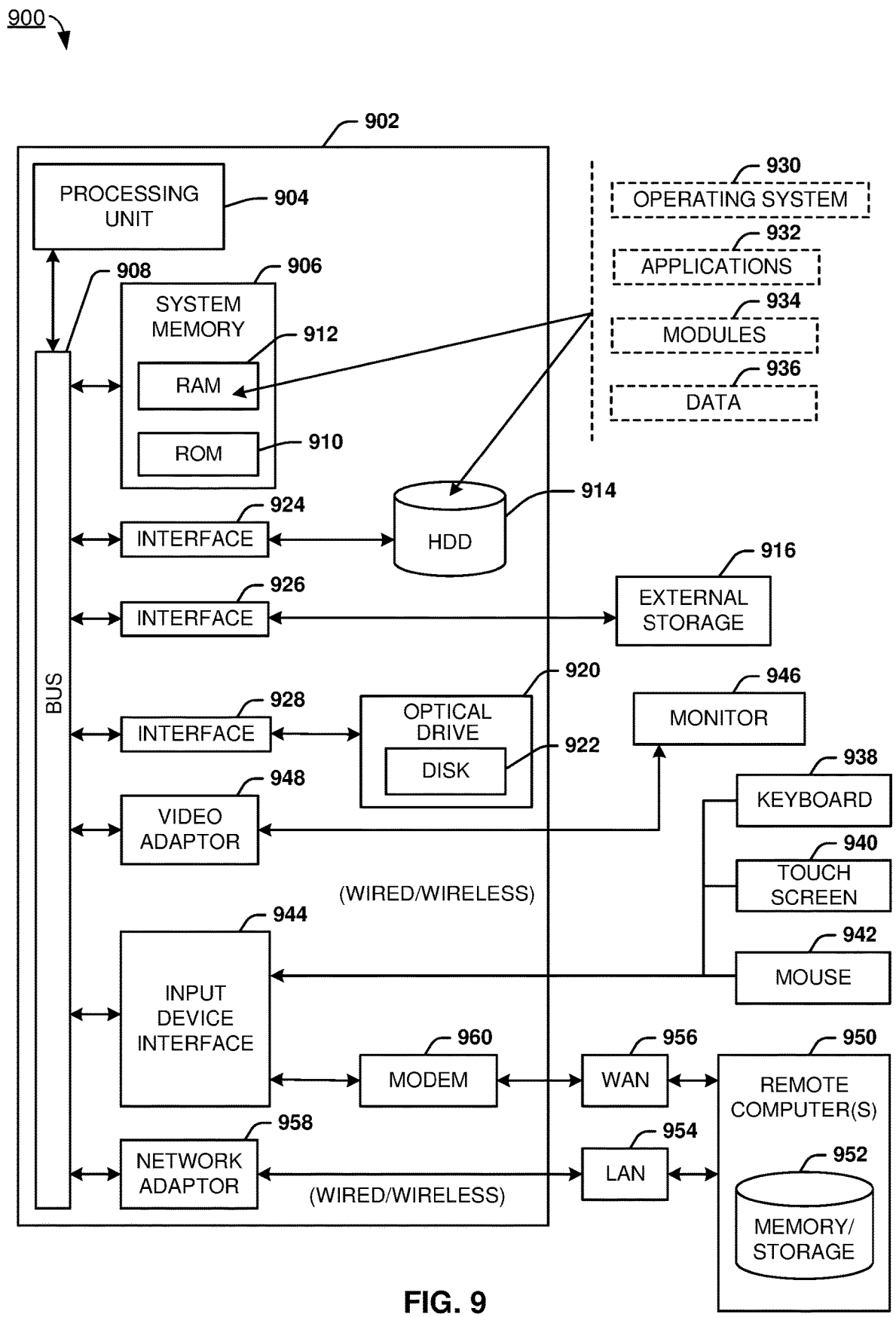
FIG. 9 illustrates an example block diagram of a computer operable to execute an embodiment of this disclosure.

Each of bio telemetry device 102A, bio telemetry device 102B, client computer 104A, client computer 104B, and server 112 can be implemented with part(s) of computing environment 900 of FIG. 9. Communications network 110 can comprise a computer communications network, such as the Internet.

In some examples, bio-telemetry extraction from online sessions component 116 can implement part(s) of the process flows of FIGS. 6-8 to facilitate bio-telemetry extraction from online sessions.

Each of bio telemetry device 102A and bio telemetry device 102B can capture bio telemetry data (e.g., EEG data) from users as users participate in an online session that is served by online session component 114, via their respective computers, client computer 104A and client computer 104B. Bio telemetry device 102A and bio telemetry device 102B can communicate with client computer 104A and client computer 104B, respectively, to share this bio telemetry data via a near field communication protocol, such as a Bluetooth communications protocol.

It can be that data about an online session is gathered at various points—at bio telemetry device 102A, at bio telemetry device 102B, and the online session itself can be captured at online session component 114. This data that is gathered by multiple computers can be synchronized, e.g., so that specific bio telemetry data for a user can be correlated with that user's facial expressions from the online session video at that time.

To synchronize the data, clock times of various components can be synchronized. Bio-telemetry extraction from online sessions component 116 can maintain time synchronization server 118, which can be a network time protocol (NTP) server that is configured to synchronize a clock time of multiple computers that communicate via a communications network (such as communications network 110).

When client application 106A or client application 106B sends an indication to server 112 that the associated user account will share bio telemetry data, bio-telemetry extraction from online sessions component 116 can use time synchronization server 118 to synchronize times at client computer 104A and client computer 104B via time synchronization client 108A and time synchronization client 108B.

In some examples, this client-side clock time that is synchronized is a clock time maintained by client application 106A, and does not modify a system-wide (or hardware-level) clock time of client computer 104A. In other examples, this client-side clock time that is synchronized can be a system-wide clock time.

Then, client computer 104A and client computer 104B can tag bio telemetry data with a clock time that will be synchronized to a meeting video time and a time of other bio telemetry data from other client computers.

It can be appreciated that system architecture 100 is one example system architecture for extracting information from online sessions, and that there can be other system architectures that facilitate determining loss of focus in online sessions. For example, online session component 114 and bio-telemetry extraction from online sessions component 116 can be implemented on different computers.

Figure 2:
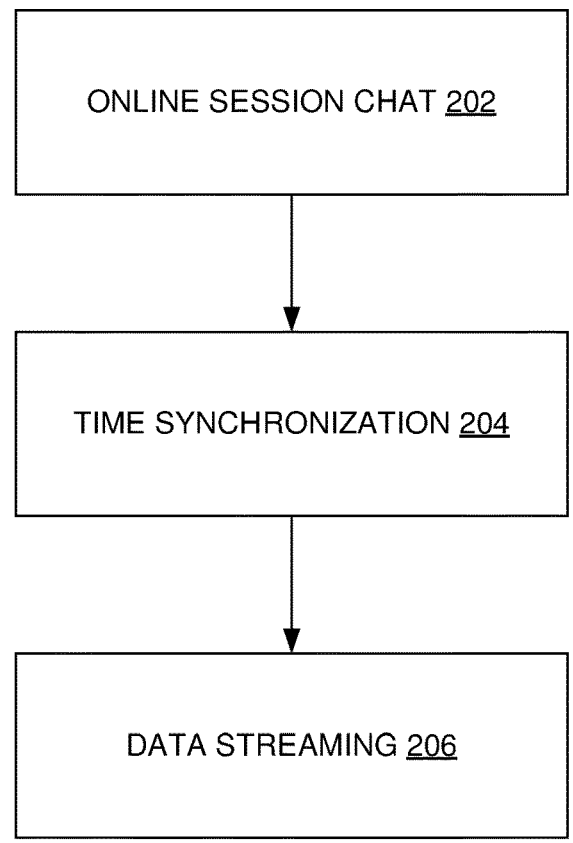
FIG. 2 illustrates another example system architecture that can facilitate bio-telemetry extraction from online sessions, in accordance with an embodiment of this disclosure.

FIG. 2 illustrates another example system architecture 200 that can facilitate bio-telemetry extraction from online sessions, in accordance with an embodiment of this disclosure. In some examples, system architecture 200 can be used to facilitate part(s) of bio-telemetry extraction from online sessions component 116 of FIG. 1

System architecture 200 comprises online session chat 202, time synchronization 204, and data streaming 206. Online session chat 202 can comprise a component in a text chat of an online session that is used to establish that a user account opts in to streaming bio telemetry data, and can be similar to user interface 300 of FIG. 3.

Figure 4:
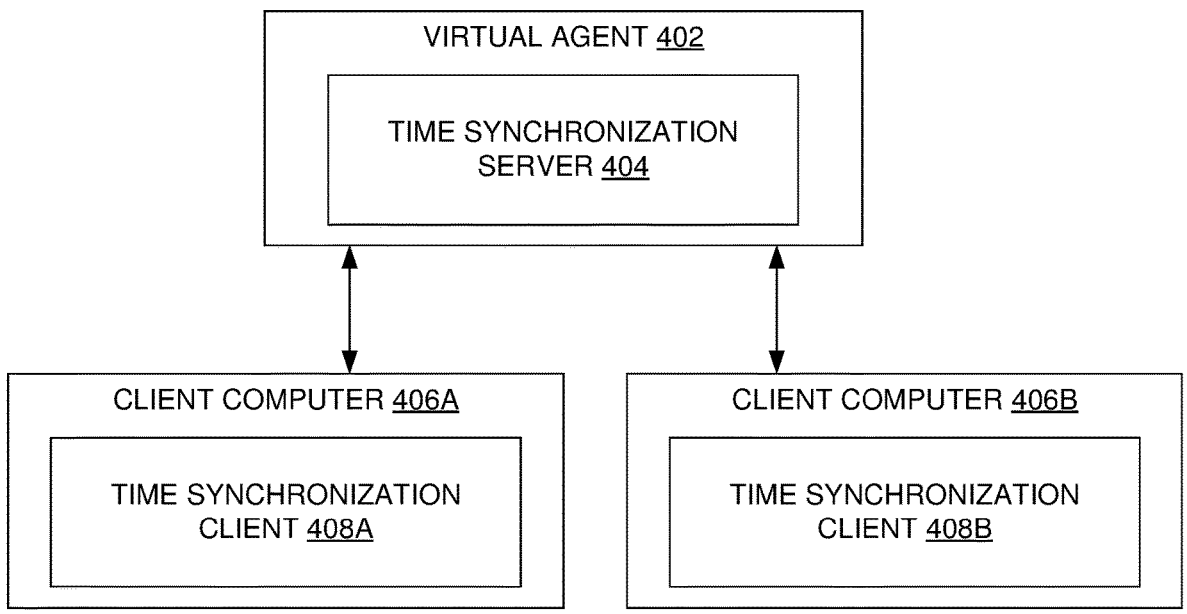
FIG. 4 illustrates another example system architecture for synchronizing time that can facilitate bio-telemetry extraction from online sessions, in accordance with an embodiment of this disclosure.

After opting in has been established, time synchronization 204 can be performed in a manner similar to that of FIG. 4. After time synchronization is performed, data streaming 206 can be performed in a manner similar to FIG. 5.

Figure 3:
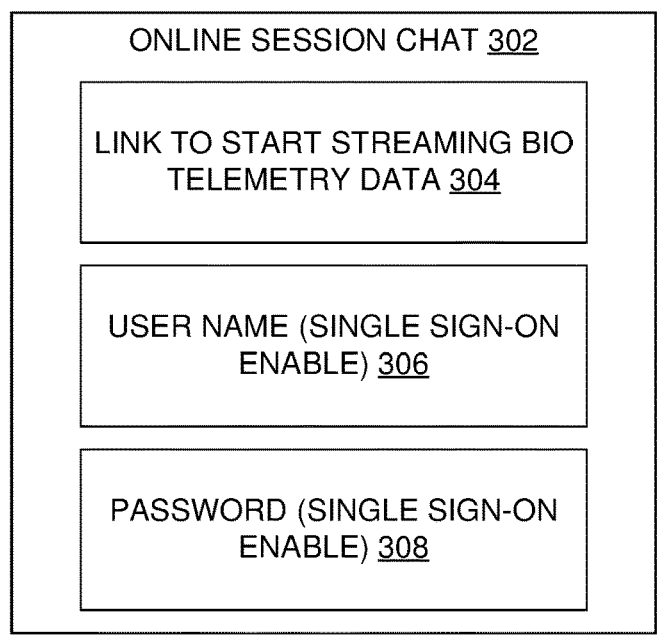
FIG. 3 illustrates an example user interface that can facilitate bio-telemetry extraction from online sessions, in accordance with an embodiment of this disclosure.

FIG. 3 illustrates an example user interface 300 that can facilitate bio-telemetry extraction from online sessions, in accordance with an embodiment of this disclosure. In some examples, user interface 300 can be used to implement part(s) of online session chat 202 of FIG. 2.

User interface 300 comprises online session chat 302, which in turn comprises link to start streaming bio telemetry data 304, user name (single sign-on enable) 306, and password (single sign-on enable) 308. Link to start streaming bio telemetry data 304 can comprise a uniform resource locator (URL) that is posted into text chat of an online session by bio-telemetry extraction from online sessions component 116. When a user account clicks on the link that can serve as opting in to sharing bio telemetry data as part of the online session.

User name 306 and password 308 can comprise data entry fields where a user can enter a user name and a password, respectively. In some examples, single sign-on functionality is provided, where a user can authenticate user name and password credentials somewhere else, and that authentication can be used here in lieu of again providing a user name at user name 306 and a password at password 308.

In user interface 300, a RPA bot can provision an instance of an application and pass a URL with a link to this instance. When the user clicks on the link in chat, the user can be taken to an application instance, and their single sign-on (SSO) information can be passed, stored as metadata, and associated with information that is streamed to the RPA bot.

FIG. 4 illustrates another example system architecture 400 for synchronizing time that can facilitate bio-telemetry extraction from online sessions, in accordance with an embodiment of this disclosure. In some examples, system architecture 400 can be used to implement part(s) of time synchronization 204 of FIG. 2.

System architecture 400 comprises virtual agent 402 (which comprises time synchronization server 404), client computer 406A (which comprises time synchronization client 408A), and client computer 406B (which comprises time synchronization client 408B).

In some examples, virtual agent 402 can be similar to bio-telemetry extraction from online sessions component 116 of FIG. 1, and time synchronization server 404 can be similar to time synchronization server 118. Then client computer 406A and client computer 406B can be similar to client computer 104A and client computer 104B, respectively; and time synchronization client 408A and time synchronization client 408B can be similar to time synchronization client 108A and time synchronization client 108B, respectively.

When data is streamed to the RPA bot, the RPA bot can leverage its clock time as the server for purposes of a network time protocol (NTP). A local client portion of the application that operates on a user's computing device can sync with the RPA bot. This can avoid relying on a time synced to a local system that could experience time delay drift or other timing issues.

Other information captured by a RPA bot (such as screen captures and facial recordings) can be timed by the RPA bot's internal clock. Syncing to one clock can avoid impacts to prediction models caused by different data sources using unsynchronized clocks.

Figure 5:
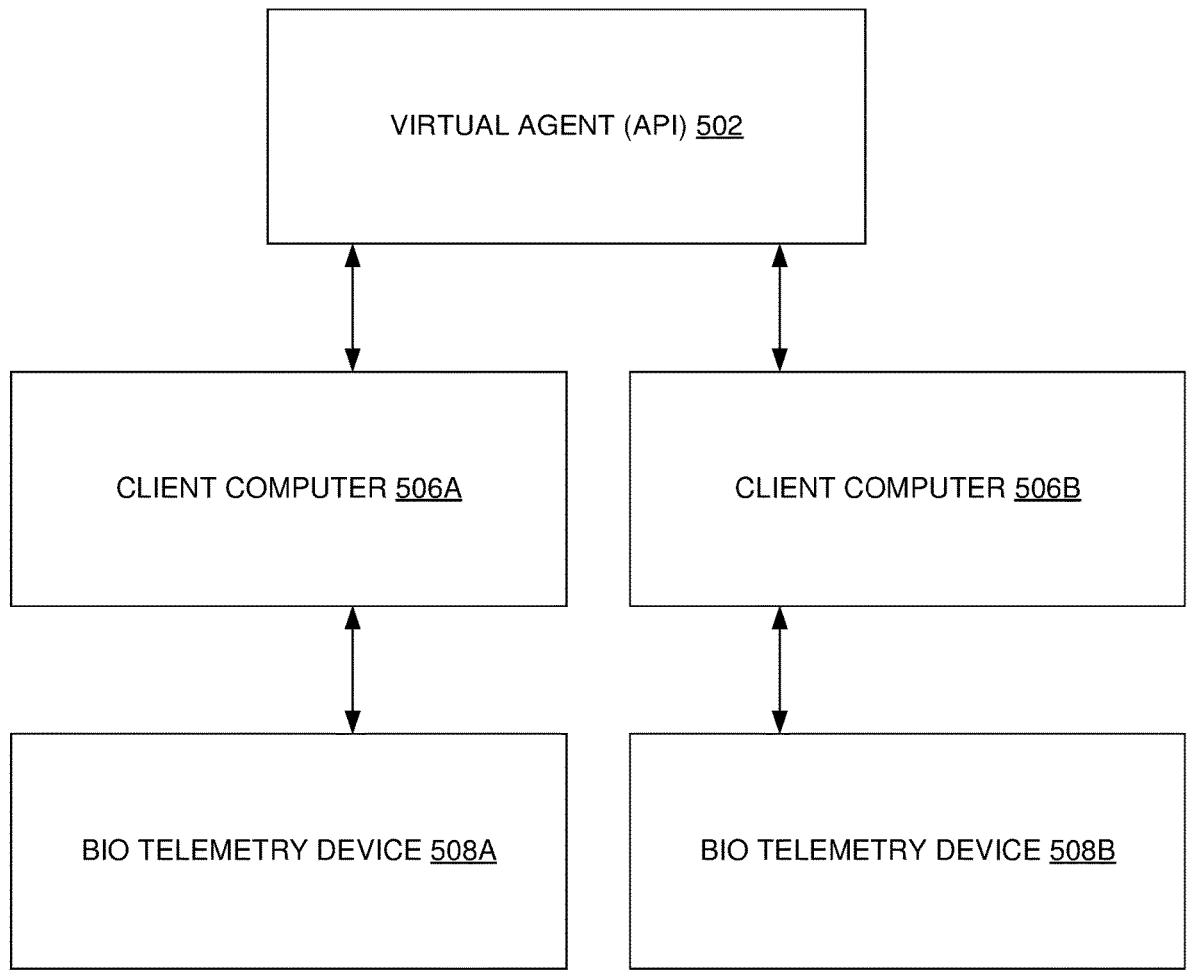
FIG. 5 illustrates another example system architecture for streaming data that can facilitate bio-telemetry extraction from online sessions, in accordance with an embodiment of this disclosure.

FIG. 5 illustrates another example system architecture 500 for streaming data that can facilitate bio-telemetry extraction from online sessions, in accordance with an embodiment of this disclosure. In some examples, system architecture 400 can be used to implement part(s) of data streaming 206 of FIG. 2.

System architecture 500 comprises virtual agent 502, client computer 506A, client computer 506B, bio telemetry device 508A, and bio telemetry device 508B. Virtual agent 502 can be similar to bio-telemetry extraction from online sessions component 116 of FIG. 1. Client computer 506A and client computer 506B can be similar to client computer 104A and client computer 104B, respectively. Bio telemetry device 508A and bio telemetry device 508B can be similar to bio telemetry device 102A and bio telemetry device 102B, respectively.

In system architecture 500, bio telemetry device 508A and bio telemetry device 508B can stream bio telemetry data to virtual agent 502, and this bio telemetry data can be tagged with the current time (established via time synchronization 204 of FIG. 2) to synchronize the multiple sources of data (e.g., multiple bio telemetry data sources and an online session video).

A local application can make an application programming interface (API) connection with a RPA bot virtual agent. The local application can buffer multiple minutes of data, package the data into hypertext transfer protocol (HTTP) POST messages that can be stored with the RPA bot, and tagged with the time and SSO metadata of the individual.

Example Process Flows

FIG. 6 illustrates an example process flow 600 that can facilitate bio-telemetry extraction from online sessions, in accordance with an embodiment of this disclosure. In some examples, one or more embodiments of process flow 600 can be implemented by bio-telemetry extraction from online sessions component 116 of FIG. 1, or computing environment 900 of FIG. 9.

It can be appreciated that the operating procedures of process flow 600 are example operating procedures, and that there can be embodiments that implement more or fewer operating procedures than are depicted, or that implement the depicted operating procedures in a different order than as depicted. In some examples, process flow 600 can be implemented in conjunction with one or more embodiments of one or more of process flow 700 of FIG. 7, and/or process flow 800 of FIG. 8.

Process flow 600 begins with 602, and moves to operation 604. Operation 604 depicts, in response to determining to capture bio telemetry data associated with client devices, synchronizing respective second clock times of respective client devices with a first clock time maintained by a network time protocol server, wherein the respective client devices are configured to capture the bio telemetry data of respective users associated with the client devices, wherein the respective users are associated with respective user accounts.

Using the example of FIG. 1, the network time protocol server can be time synchronization server 118, the client devices can be client computer 104A and client computer 104B, and the second clock times can be clock times maintained by time synchronization client 108A and time synchronization client 108B.

In some examples, when a user opts in to sharing bio telemetry data as part of an online session, that user's local computer can communicate with a virtual agent that is functioning as a network time protocol server to synchronize a local clock time.

In some examples, determining to capture the bio telemetry data associated with client devices comprises determining that a user account, associated with a user, of the respective user accounts comprises opt in data representative of an indication that the user has opted in to sharing of user bio telemetry data associated with the user. That is, users can opt in to sharing bio telemetry data.

In some examples, operation 604 comprises sharing a link in a chat of the online session, wherein the determining that the user account comprises the opt in data representative of the indication that the user has opted in to sharing of the user bio telemetry data comprises determining that an action has been taken in association with the user account that has triggered the link. That is, a user can opt in to sharing bio telemetry data by clicking a link in a text chat of the online session.

In some examples, a component comprises the network time protocol server, and the component performs the sharing of the link in the chat of the online session. That is, a virtual agent that also provides network time protocol server functionality can post the link to the online session chat.

In some examples, a component comprises the network time protocol server, and the component provisions an instance of a process that receives the bio telemetry data from the respective client devices, and wherein the link links to the instance of the process. That is, the virtual agent can provision an instance of an application and pass a URL with a link to that instance.

In some examples, determining that the action has been taken in association with the user account that has triggered the link comprises receiving the indication that the action has been taken in association with the user account that has triggered the link, and wherein the indication comprises single-sign on information associated with the user account. That is, SSO information for a user can be passed to a virtual agent when the user clicks the link.

In some examples, operation 604 comprises storing the single-sign on information, resulting in stored single-sign on information, and associating the stored single-sign on information with the user bio telemetry data that is received and that is associated with the user account. That is, SSO information for a user can be used to associate bio telemetry data received at a server with a particular user.

After operation 604, process flow 600 moves to operation 606.

Operation 606 depicts synchronizing the bio telemetry data of the respective users based on the respective second clock times. That is, this data from different sources can all have synchronized clock times tagged to it, and the time information can be used to synchronize the data.

After operation 606, process flow 600 moves to 608, where process flow 600 ends.

FIG. 7 illustrates an example process flow 700 that can facilitate bio-telemetry extraction from online sessions, in accordance with an embodiment of this disclosure. In some examples, one or more embodiments of process flow 700 can be implemented by bio-telemetry extraction from online sessions component 116 of FIG. 1, or computing environment 900 of FIG. 9.

It can be appreciated that the operating procedures of process flow 700 are example operating procedures, and that there can be embodiments that implement more or fewer operating procedures than are depicted, or that implement the depicted operating procedures in a different order than as depicted. In some examples, process flow 700 can be implemented in conjunction with one or more embodiments of one or more of process flow 600 of FIG. 6, and/or process flow 800 of FIG. 8.

Process flow 700 begins with 702, and moves to operation 704. Operation 704 depicts maintaining a network time protocol server, wherein the network time protocol server maintains a first clock time. In some examples, operation 704 can be implemented in a similar manner as those parts of operation 604 of FIG. 6 that relate to a network time protocol server.

After operation 704, process flow 700 moves to operation 706.

Operation 706 depicts, in response to determining to capture bio telemetry data associated with a first client computing device, synchronizing a second clock time of the client computing device with the first clock time, wherein the client computing device is configured to capture bio telemetry data of a first user associated with the first client computing device, and wherein the first user is associated with a first user account. In some examples, operation 706 can be implemented in a similar manner as operation 604 of FIG. 6.

In some examples, the first client computing device captures the bio telemetry data of the first user via a bio telemetry device that communicates with the first client computing device via a near field communication protocol. That is, an architecture such as system architecture 100 of FIG. 1 can be implemented. In system architecture 100, bio telemetry device 102A communicates with client computer 104A, which communicates with server 112 via communications network 110.

In some examples, the bio telemetry data comprises electroencephalography data.

After operation 706, process flow 700 moves to operation 708.

Operation 708 depicts, in response to determining to capture bio telemetry data associated with a second client computing device, synchronizing a third clock time of the client computing device with the first clock time, wherein the second client computing device is configured to capture bio telemetry data of a second user associated with the second client computing device. In some examples, operation 708 can be implemented in a similar manner as operation 706, as applied to another client computing device.

After operation 708, process flow 700 moves to operation 710.

Operation 710 depicts synchronizing the bio telemetry data of the first user with the bio telemetry data of the second user based on the second clock time and the third clock time. In some examples, operation 710 can be implemented in a similar manner as operation 608 of FIG. 6.

In some examples, operation comprises receiving, from the first client computing device, first bio telemetry data, wherein the first client computing device buffers the first bio telemetry data before transmitting the first bio telemetry data. That is, the client can buffer bio telemetry data.

In some examples, the first bio telemetry data is received as a hyper text transfer protocol POST message.

In some examples, the first bio telemetry data that is received is tagged with a time at which the first bio telemetry data was captured, and wherein the time at which the first bio telemetry data was captured was determined based on the second clock time.

In some examples, the first bio telemetry data that is received is tagged with single-sign in information associated with the first user account.

After operation 710, process flow 700 moves to 712, where process flow 700 ends.

FIG. 8 illustrates an example process flow 800 that can facilitate bio-telemetry extraction from online sessions, in accordance with an embodiment of this disclosure. In some examples, one or more embodiments of process flow 800 can be implemented by bio-telemetry extraction from online sessions component 116 of FIG. 1, or computing environment 900 of FIG. 9.

It can be appreciated that the operating procedures of process flow 800 are example operating procedures, and that there can be embodiments that implement more or fewer operating procedures than are depicted, or that implement the depicted operating procedures in a different order than as depicted. In some examples, process flow 800 can be implemented in conjunction with one or more embodiments of one or more of process flow 600 of FIG. 6, and/or process flow 700 of FIG. 7.

Process flow 800 begins with 802, and moves to operation 804. Operation 804 depicts, in response to determining to capture bio telemetry data associated with a first client computing device, synchronizing a second clock time of the client computing device with a first clock time maintained by a network time protocol server, wherein the client computing device is configured to capture bio telemetry data of a first user associated with the first client computing device, and wherein the first user is associated with a first user account. In some examples, operation 804 can be implemented in a similar manner as operation 604 of FIG. 6.

In some examples, determining to capture the bio telemetry data associated with the computing device comprises determining that the first user account has opted in to sharing the bio telemetry data of the first user.

In some examples, operation 804 comprises posting a link in a chat of the online session, and determining that the first user account has opted in to sharing the bio telemetry data of the first user based on receiving an indication that the link has been engaged via the first user account.

In some examples, operation 804 comprises provisioning an instance of a process that receives the bio telemetry data from the computing device, wherein the link links to the instance of the process.

In some examples, operation 804 comprises storing single-sign on information that is associated with the user account and that is received as part of the user account opting in to sharing the bio telemetry data, resulting in stored single-sign on information; and associating the stored single-sign on information with the bio telemetry data that is received and that is associated with the user account.

In some examples, the second clock time is maintained by a first application of the first computing device, and is separate from a third clock time that is maintained at a system level of the first computing device, wherein the third clock time is accessed by a second application of the first computing device. That is, for example, client application 106A of FIG. 1 can maintain the second clock time and use it for tagging bio telemetry data, where this second clock time is not used by client computer 104A as a whole. Other applications can use a third clock time that is a system clock time maintained by client computer 104A.

In some examples, the second clock time comprises a system-wide clock time of the first computing device. That is, synchronizing the second clock time for the first computing device can comprise synchronizing a system-wide clock time used by applications on client computer 104 of FIG. 1.

After operation 804, process flow 800 moves to operation 806.

Operation 806 depicts, in response to determining to capture bio telemetry data associated with a second client computing device, synchronizing a third clock time of the client computing device with the first clock time, wherein the second client computing device is configured to capture bio telemetry data of a second user associated with the second client computing device. In some examples, operation 806 can be implemented in a similar manner as operation 804, as applied to a different client computing device.

After operation 806, process flow 800 moves to operation 808.

Operation 808 depicts synchronizing the bio telemetry data of the first user with the bio telemetry data of the second user based on the second clock time and the third clock time. In some examples, operation 808 can be implemented in a similar manner as operation 608 of FIG. 6.

In some examples, operation 808 comprises receiving tagged bio telemetry data from the computing device, wherein the tagged bio telemetry data comprises the bio telemetry data and a tag of a first time at which the bio telemetry data was generated, wherein the first time is based on the second clock time.

In some examples, operation 808 comprises capturing a video recording of an online session, wherein the video recording comprises video of a face of the first user, and synchronizing the video recording with the bio telemetry data of the first user and the bio telemetry data of the second user based on the first clock time, the second clock time, and the third clock time. That is, where the users are part of an online session, such as an online meeting, a video recording of the online session can be made and synchronized with the bio telemetry data.

After operation 808, process flow 800 moves to 810, where process flow 800 ends.

Example Operating Environment

In order to provide additional context for various embodiments described herein, FIG. 9 and the following discussion are intended to provide a brief, general description of a suitable computing environment 900 in which the various embodiments of the embodiment described herein can be implemented.

For example, parts of computing environment 900 can be used to implement one or more embodiments of bio telemetry device 102A, bio telemetry device 102B, client computer 104A, client computer 104B, and/or server 112 of FIG. 1.

In some examples, computing environment 900 can implement one or more embodiments of the process flows of FIGS. 6-8 to facilitate bio-telemetry extraction from online sessions.

While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 9, the example environment 900 for implementing various embodiments described herein includes a computer 902, the computer 902 including a processing unit 904, a system memory 906 and a system bus 908. The system bus 908 couples system components including, but not limited to, the system memory 906 to the processing unit 904. The processing unit 904 can be any of various commercially available processors. Dual microprocessors and other multi-processor architectures can also be employed as the processing unit 904.

The system bus 908 can be any of several types of bus structure that can further interconnect to a memory bus (with or without a memory controller), a peripheral bus, and a local bus using any of a variety of commercially available bus architectures. The system memory 906 includes ROM 910 and RAM 912. A basic input/output system (BIOS) can be stored in a nonvolatile storage such as ROM, erasable programmable read only memory (EPROM), EEPROM, which BIOS contains the basic routines that help to transfer information between elements within the computer 902, such as during startup. The RAM 912 can also include a high-speed RAM such as static RAM for caching data.

The computer 902 further includes an internal hard disk drive (HDD) 914 (e.g., EIDE, SATA), one or more external storage devices 916 (e.g., a magnetic floppy disk drive (FDD) 916, a memory stick or flash drive reader, a memory card reader, etc.) and an optical disk drive 920 (e.g., which can read or write from a CD-ROM disc, a DVD, a BD, etc.). While the internal HDD 914 is illustrated as located within the computer 902, the internal HDD 914 can also be configured for external use in a suitable chassis (not shown). Additionally, while not shown in environment 900, a solid state drive (SSD) could be used in addition to, or in place of, an HDD 914. The HDD 914, external storage device(s) 916 and optical disk drive 920 can be connected to the system bus 908 by an HDD interface 924, an external storage interface 926 and an optical drive interface 928, respectively. The interface 924 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 902, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 912, including an operating system 930, one or more application programs 932, other program modules 934 and program data 936. All or portions of the operating system, applications, modules, and/or data can also be cached in the RAM 912. The systems and methods described herein can be implemented utilizing various commercially available operating systems or combinations of operating systems.

Computer 902 can optionally comprise emulation technologies. For example, a hypervisor (not shown) or other intermediary can emulate a hardware environment for operating system 930, and the emulated hardware can optionally be different from the hardware illustrated in FIG. 9. In such an embodiment, operating system 930 can comprise one virtual machine (VM) of multiple VMs hosted at computer 902. Furthermore, operating system 930 can provide runtime environments, such as the Java runtime environment or the .NET framework, for applications 932. Runtime environments are consistent execution environments that allow applications 932 to run on any operating system that includes the runtime environment. Similarly, operating system 930 can support containers, and applications 932 can be in the form of containers, which are lightweight, standalone, executable packages of software that include, e.g., code, runtime, system tools, system libraries and settings for an application.

Further, computer 902 can be enabled with a security module, such as a trusted processing module (TPM). For instance, with a TPM, boot components hash next in time boot components, and wait for a match of results to secured values, before loading a next boot component. This process can take place at any layer in the code execution stack of computer 902, e.g., applied at the application execution level or at the operating system (OS) kernel level, thereby enabling security at any level of code execution.

A user can enter commands and information into the computer 902 through one or more wired/wireless input devices, e.g., a keyboard 938, a touch screen 940, and a pointing device, such as a mouse 942. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 904 through an input device interface 944 that can be coupled to the system bus 908, but can be connected by other interfaces, such as a parallel port, an IEEE 1394 serial port, a game port, a USB port, an IR interface, a BLUETOOTH® interface, etc.

A monitor 946 or other type of display device can be also connected to the system bus 908 via an interface, such as a video adapter 948. In addition to the monitor 946, a computer typically includes other peripheral output devices (not shown), such as speakers, printers, etc.

The computer 902 can operate in a networked environment using logical connections via wired and/or wireless communications to one or more remote computers, such as a remote computer(s) 950. The remote computer(s) 950 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 952 is illustrated. The logical connections depicted include wired/wireless connectivity to a local area network (LAN) 954 and/or larger networks, e.g., a wide area network (WAN) 956. Such LAN and WAN networking environments are commonplace in offices and companies, and facilitate enterprise-wide computer networks, such as intranets, all of which can connect to a global communications network, e.g., the Internet.

When used in a LAN networking environment, the computer 902 can be connected to the local network 954 through a wired and/or wireless communication network interface or adapter 958. The adapter 958 can facilitate wired or wireless communication to the LAN 954, which can also include a wireless access point (AP) disposed thereon for communicating with the adapter 958 in a wireless mode.

When used in a WAN networking environment, the computer 902 can include a modem 960 or can be connected to a communications server on the WAN 956 via other means for establishing communications over the WAN 956, such as by way of the Internet. The modem 960, which can be internal or external and a wired or wireless device, can be connected to the system bus 908 via the input device interface 944. In a networked environment, program modules depicted relative to the computer 902 or portions thereof, can be stored in the remote memory/storage device 952. It will be appreciated that the network connections shown are examples and other means of establishing a communications link between the computers can be used.

When used in either a LAN or WAN networking environment, the computer 902 can access cloud storage systems or other network-based storage systems in addition to, or in place of, external storage devices 916 as described above. Generally, a connection between the computer 902 and a cloud storage system can be established over a LAN 954 or WAN 956 e.g., by the adapter 958 or modem 960, respectively. Upon connecting the computer 902 to an associated cloud storage system, the external storage interface 926 can, with the aid of the adapter 958 and/or modem 960, manage storage provided by the cloud storage system as it would other types of external storage. For instance, the external storage interface 926 can be configured to provide access to cloud storage sources as if those sources were physically connected to the computer 902.

The computer 902 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

CONCLUSION

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. For instance, when a processor executes instructions to perform "operations", this could include the processor performing the operations directly and/or facilitating, directing, or cooperating with another device or component to perform the operations.

In the subject specification, terms such as "datastore," data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile storage, or can include both volatile and nonvolatile storage. By way of illustration, and not limitation, nonvolatile storage can include ROM, programmable ROM (PROM), EPROM, EEPROM, or flash memory. Volatile memory can include RAM, which acts as external cache memory. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated embodiments of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an ASIC, or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or application programming interface (API) components.

Further, the various embodiments can be implemented as a method, apparatus, or article of manufacture using standard programming and/or engineering techniques to produce software, firmware, hardware, or any combination thereof to control a computer to implement one or more embodiments of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical discs (e.g., CD, DVD . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any embodiment or design described herein as "exemplary" is not necessarily to be construed as preferred or advantageous over other embodiments or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
   a processor; and
   a memory that stores executable instructions that, when executed by the processor, facilitate performance of operations, comprising:
   in response to determining to capture bio telemetry data associated with client devices, synchronizing respective second clock times of respective client devices with a first clock time maintained by a network time protocol server, wherein the respective client devices are configured to capture the bio telemetry data of respective users associated with the client devices, and wherein the respective users are associated with respective user accounts, wherein the determining to capture the bio telemetry data associated with client devices comprises determining that a user account, associated with a user, of the respective user accounts comprises opt in data representative of an indication that the user has opted in to sharing of user bio telemetry data associated with the user; and
   synchronizing the bio telemetry data of the respective users based on the respective second clock times.

2. The system of claim 1, wherein the operations further comprise:
   sharing a link in a chat of the online session, wherein the determining that the user account comprises the opt in data representative of the indication that the user has opted in to sharing of the user bio telemetry data comprises determining that an action has been taken in association with the user account that has triggered the link.

3. The system of claim 2, wherein a component comprises the network time protocol server, and wherein the component performs the sharing of the link in the chat of the online session.

4. The system of claim 2, wherein a component comprises the network time protocol server, wherein the component provisions an instance of a process that receives the bio telemetry data from the respective client devices, and wherein the link links to the instance of the process.

5. The system of claim 2, wherein the determining that the action has been taken in association with the user account that has triggered the link comprises receiving the indication that the action has been taken in association with the user account that has triggered the link, and wherein the indication comprises single-sign on information associated with the user account.

6. The system of claim 5, wherein the operations further comprise:
storing the single-sign on information, resulting in stored single-sign on information; and
associating the stored single-sign on information with the user bio telemetry data that is received and that is associated with the user account.

7. The system of claim 1, wherein the operations further comprise:
receiving, from a first client device of the client devices, first bio telemetry data, wherein the first client device buffers the first bio telemetry data before transmitting the first bio telemetry data.

8. A method, comprising:
maintaining, by a system comprising a processor, a network time protocol server, wherein the network time protocol server maintains a first clock time;
in response to determining to capture bio telemetry data associated with a first client computing device, synchronizing, by the system, a second clock time of the client computing device with the first clock time, wherein the client computing device is configured to capture bio telemetry data of a first user associated with the first client computing device, and wherein the first user is associated with a first user account, wherein the determining to capture the bio telemetry data associated with the first client computing device comprises determining that the first user account has opted in to sharing the bio telemetry data of the first user;
in response to determining to capture bio telemetry data associated with a second client computing device, synchronizing, by the system, a third clock time of the client computing device with the first clock time, wherein the second client computing device is configured to capture bio telemetry data of a second user associated with the second client computing device; and
synchronizing, by the system, the bio telemetry data of the first user with the bio telemetry data of the second user based on the second clock time and the third clock time.

9. The method of claim 8, further comprising:
receiving, from the first client computing device, first bio telemetry data, wherein the first client computing device buffers the first bio telemetry data before transmitting the first bio telemetry data.

10. The method of claim 9, wherein the first bio telemetry data is received as a hyper text transfer protocol POST message.

11. The method of claim 9, wherein the first bio telemetry data that is received is tagged with a time at which the first bio telemetry data was captured, and wherein the time at which the first bio telemetry data was captured was determined based on the second clock time.

12. The method of claim 9, wherein the first bio telemetry data that is received is tagged with single-sign in information associated with the first user account.

13. The method of claim 8, wherein the first client computing device captures the bio telemetry data of the first user via a bio telemetry device that communicates with the first client computing device via a near field communication protocol.

14. The method of claim 8, wherein the bio telemetry data comprises electroencephalography data.

15. A non-transitory computer-readable medium comprising instructions that, in response to execution, cause a system comprising a processor to perform operations, comprising:
in response to determining to capture bio telemetry data associated with a first client computing device, synchronizing a second clock time of the client computing device with a first clock time maintained by a network time protocol server, wherein the client computing device is configured to capture bio telemetry data of a first user associated with the first client computing device, and wherein the first user is associated with a first user account, wherein the determining to capture the bio telemetry data associated with the first computing device comprises determining that the first user account has opted in to sharing the bio telemetry data of the first user;
in response to determining to capture bio telemetry data associated with a second client computing device, synchronizing a third clock time of the client computing device with the first clock time, wherein the second client computing device is configured to capture bio telemetry data of a second user associated with the second client computing device; and
synchronizing the bio telemetry data of the first user with the bio telemetry data of the second user based on the second clock time and the third clock time.

16. The non-transitory computer-readable medium of claim 15, wherein the operations further comprise:
capturing a video recording of an online session, wherein the video recording comprises video of a face of the first user; and
synchronizing the video recording with the bio telemetry data of the first user and the bio telemetry data of the second user based on the first clock time, the second clock time, and the third clock time.

17. The non-transitory computer-readable medium of claim 15, wherein the second clock time is maintained by a first application of the first computing device, and is separate from a third clock time that is maintained at a system level of the first computing device, wherein the third clock time is accessed by a second application of the first computing device.

18. The non-transitory computer-readable medium of claim 15, wherein the second clock time comprises a system-wide clock time of the first computing device.

19. The non-transitory computer-readable medium of claim 15, wherein the operations further comprise:
posting a link in a chat of the online session; and
determining that the first user account has opted in to sharing the bio telemetry data of the first user based on receiving an indication that the link has been engaged via the first user account.

20. The non-transitory computer-readable medium of claim 15, wherein the operations further comprise:
receiving, from the first client computing device, the first bio telemetry data, wherein the first client computing device buffers the first bio telemetry data before transmitting the first bio telemetry data.

\* \* \* \* \*